United States Patent
Corwin

[15] 3,656,357
[45] Apr. 18, 1972

[54] SHAFT FEEDING APPARATUS

[72] Inventor: Harry L. Corwin, 3341 Wood Terrace, Los Angeles, Calif. 90027

[22] Filed: Dec. 29, 1969

[21] Appl. No.: 888,600

[52] U.S. Cl...................................................74/89, 74/25
[51] Int. Cl...............................................F16h 27/02
[58] Field of Search............................................74/89, 25

[56] References Cited

UNITED STATES PATENTS

| | | | |
|---|---|---|---|
| 3,473,393 | 10/1969 | Zaruba | 74/25 |
| 3,475,972 | 11/1969 | Steibel | 74/25 |
| 2,152,518 | 3/1939 | Wolff | 74/25 |
| 2,578,026 | 12/1951 | Taylor | 74/25 |
| 3,256,743 | 6/1966 | Valliere | 74/25 |
| 2,204,638 | 6/1940 | Weathers | 74/25 |

Primary Examiner—Milton Kaufman
Assistant Examiner—Wesley S. Ratliff, Jr.
Attorney—Christie, Parker & Hale

[57] ABSTRACT

An apparatus particularly useful for expanding ends of tubing for attachment to a tube sheet or the like is described. A conventional tube expander comprising a hollow cage with swaging rollers fits within the tube and a rotating tapered mandrel within the expander cage causes the cage and rollers to rotate and also spreads the rollers radially against the tube wall as the mandrel advances, thereby enlarging the portion of tubing adjacent the rollers. The mandrel is connected to a rotatable cylindrical shaft that is surrounded by a plurality of drive rollers having their axes skewed relative to the shaft axis, and contained within a fixed housing for slowly advancing the shaft in response to its rotation and withdrawing the shaft when direction of rotation is reversed. A retainer cage and a sleeve engage opposite ends of the drive rollers and are relatively movable for adjusting the skew angle of the drive rollers for adjusting the axial feed rate of the shaft and mandrel. The housing has a tapered inside surface for adjusting the clearance between the shaft and housing within which the drive rollers fit for accommodating manufacturing tolerances and wear. A torque limiting or sensing mechanism between the tube expanding apparatus and a motor means for rotating the shaft, reverses the motor rotation when the tube is properly expanded for automatic withdrawal.

10 Claims, 5 Drawing Figures

United States Patent
Corwin
[15] 3,656,357
[45] Apr. 18, 1972
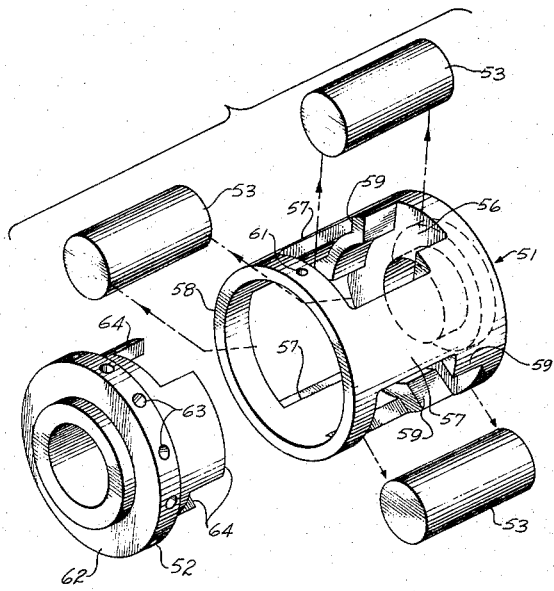

PATENTED APR 18 1972

INVENTOR.
HARRY L. CORWIN
BY
Christie, Parker & Hale
ATTORNEYS

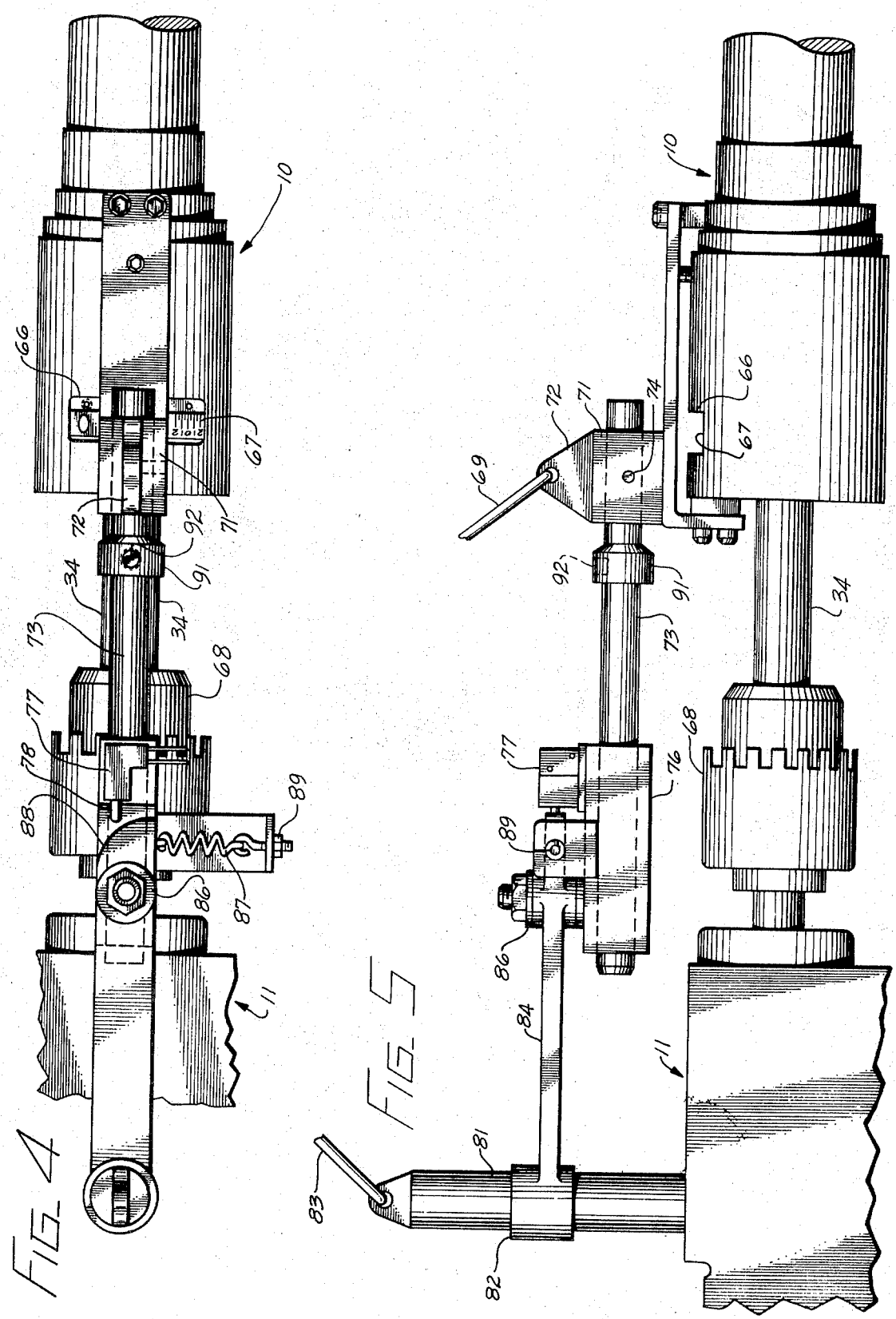

SHAFT FEEDING APPARATUS

BACKGROUND

In the manufacture of boilers, heat exchangers, and many other types of apparatus, it is desirable to connect the end of a piece of tubing within an aperture. In many instances this is done by expanding the outside diameter of the tubing to tightly fit within the aperture, commonly referred to as tube rolling. Such tube expanding is often done even though the tubing is to be welded to the tube sheet so as to minimize the possibility of crevice corrosion and the like, and to further seal the joint against leakage.

Two types of conventional tube expanding apparatus are presently employed, and both have substantial shortcomings. In both of these apparatus, an expander cage is inserted within the tube to be expanded and a plurality of swaging rollers are positioned in the cage in the portion inserted in the tube so as to bear against the inside wall of the tube. In one typical embodiment of conventional apparatus, the cage may be about one-half inch diameter and three 3/16-inch diameter rolls about 1¾ to 2¼ inch long are mounted with their axes approximately parallel or somewhat angled to the axis of the cage. The cage is hollow and a tapered mandrel extends along the length and between the swaging rolls in the cage. Much larger sizes are available. The mandrel is conventionally rotated, thereby causing the cage to rotate about its axis and swaging rollers to rotate about their respective axes. The tapered mandrel is slowly fed forwardly along its axis so as to have a continually increasing diameter between the swaging rollers, thereby progressively forcing these rollers radially outwardly. The continual expansion of the swaging rollers against the inside diameter of the tube as the mandrel advances causes the inside and outside diameters of the tubing to increase.

The difference between the two conventional mechanisms for tubing expansion is in the means for causing the tapered mandrel to feed along its axis and expand the swaging rollers. According to one technique, known in the trade as a self-feeding tube expander, the axes of the swaging rollers are skewed relative to the axis of the tapered mandrels so that as the mandrel rotates the angle of application of force by the skewed swaging rollers on the mandrel applies some component of force along the length of the mandrel and causes it to advance at a rate determined by the skew angle of the rollers, and the speed of rotation of the expanding tool. The cage is withdrawn from the tubing after expanding by reversing the direction of rotation of the mandrel, which causes the mandrel to retreat so that the rollers can collapse inwardly, freeing the tool from the tubing and permitting it to be withdrawn by hand. Such an apparatus has a significant shortcoming in that the feed rate of the mandrel cannot be controlled without changing the speed of rotation, but is fixed by the skew angle of the swaging rollers. The skew angle cannot be changed without replacing the cage portion of the tool. The swaging rollers are within the tube being expanded and often accumulate scale and dirt which interfere with the mandrel feeding, cause overheating and interferes with lubrication.

When the swaging rollers are skewed relative to the axis of the expander cage and mandrel, they can have only a limited length with the limit decreasing with increasing skew angle. It is apparent that if the rollers are skewed an appreciable amount they cannot be indefinitely long or they will not bear on the mandrel and tube walls at their ends without significant bending. Thus in a self-feeding tube expanding tool for ¾-inch diameter tubing, a maximum roller length of about 2¼ inch is possible. In some applications tube sheets as much as 20 inches thick are involved and it is necessary to expand a short length of tubing and then advance the tool progressively to expand the full length.

According to another technique for causing the mandrel to advance, the swaging rollers are maintained with their axes substantially parallel to the axis of the expander cage, and a hydraulic mechanism is employed for feeding and withdrawing the rotating mandrel in a direction along its axis. Such an arrangement provides flexibility in controlling the feed rate of the mandrel without changing the speed of rotation, and permits use of longer swaging rollers than a self-feeding tool; however, in order to produce a practical unit, a relatively expensive hydraulic system must be provided and the additional mechanism is cumbersome to handle since hydraulic as well as power lines must be brought from the hydraulic control unit to the tube expanding apparatus. The hydraulically operated apparatus is large and heavy and is, therefore, suitable for manufacturing operations in a plant where a substantial amount of tube expanding is to be done and the work can be brought to the machine. The hydraulic unit is not, however, suitable for field work wherein the tube expanding equipment is taken to the site for replacement or repair operations. The hydraulic unit is expensive to purchase and maintain. Sometimes a tube expander must be used inside apparatus already partly assembled and it is quite impractical to take a hydraulic unit through manholes and other places of narrow access.

Because of the shortcomings of the existing tube expanding apparatus, it is desirable to provide an improved tube expander that is simple and economical to make and operate, is reliable and adjustable for all tube expanding operations. Such a tube expanding apparatus should be readily adaptable to operation at remote and inaccessible locations, as well as convenient use in a manufacturing plant.

BRIEF SUMMARY OF THE INVENTION

Thus, in practice of this invention according to a preferred embodiment there is provided a means for feeding a rotatable shaft along its length at a controlled rate that is particularly suitable for a tube expanding apparatus. A rotatable cylindrical shaft feeds along its length due to a plurality of skewed drive rollers around the periphery operating between the rotatable shaft and a fixed housing. A cage surrounds a portion of the shaft for containing the rollers and means are provided for adjusting the skew angle of the rollers relative to the shaft for varying the feed rate. In a preferred embodiment, means are provided for sensing the torque between the shaft and housing for reversing the motor, and means are provided for assuring a tight fit between the shaft and housing.

DRAWINGS

These and other features and advantages of this invention will be readily appreciated as the same becomes better understood by reference to the following detailed description of a presently preferred embodiment when considered in connection with the accompanying drawings wherein:

FIG. 4 is a top view of the tube expanding apparatus and a drive motor illustrating a torque limiting feature; and FIG. 5 is a side view of the apparatus illustrated in FIG. 4.

Throughout the drawings like numerals refer to like parts.

DESCRIPTION

Figure 1:
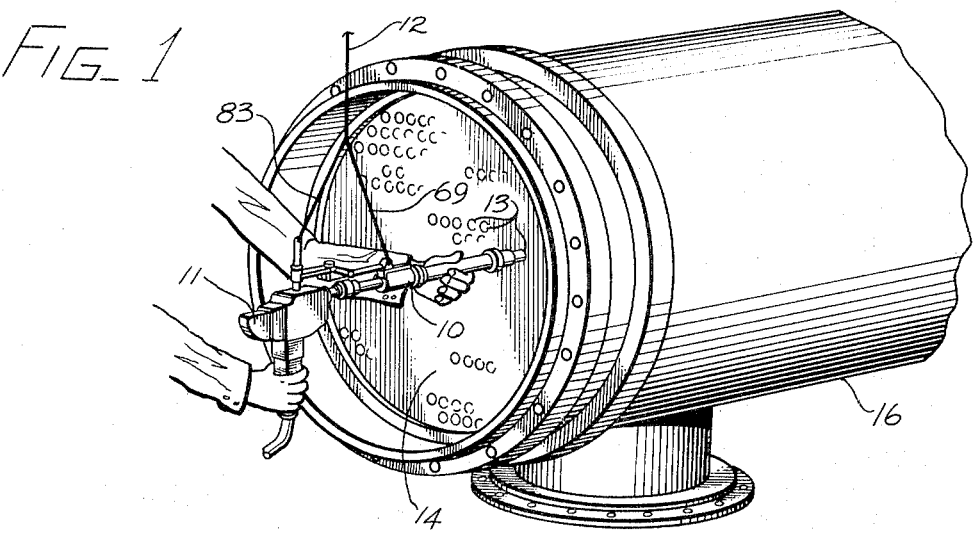
FIG. 1 illustrates a tube expanding apparatus constructed according to principles of this invention as employed for expanding heat exchanger tubes.

FIG. 1 illustrates a tube expanding apparatus 10 constructed according to principles of this invention. A conventional reversible electric or pneumatic drill motor 11 or the like is connected to the tube expander 10 for providing a rotational drive. A support cable sling 12 may be provided if desired from an overhead support (not shown) for bearing the weight of the apparatus for minimizing operator fatigue when a large number of tubes are to be expanded in a given location and also for limiting twisting of the parts as hereinafter described. If desired a dynamic balancer can be employed between the sling and the overhead support for taking the weight of the apparatus and permitting motion from one location to another. The balancer is preferably one sensitive to speed of motion so that the apparatus can be moved relatively slowly but the sling is prevented from rapidly winding about the motor and expander when in use. As illustrated in FIG. 1, the tube expander 10 has an end inserted in the opening of a tube 13 in the end tube sheet 14 of a heat exchanger 16. In such operation, the operator successively inserts the end of the tube expander into each tube 13 and expands the end portion of the tube to fit tightly against the apertures in the tube sheet 14, and in some circumstances, the end of the tubing may also be welded to the tube sheet.

Figure 2:
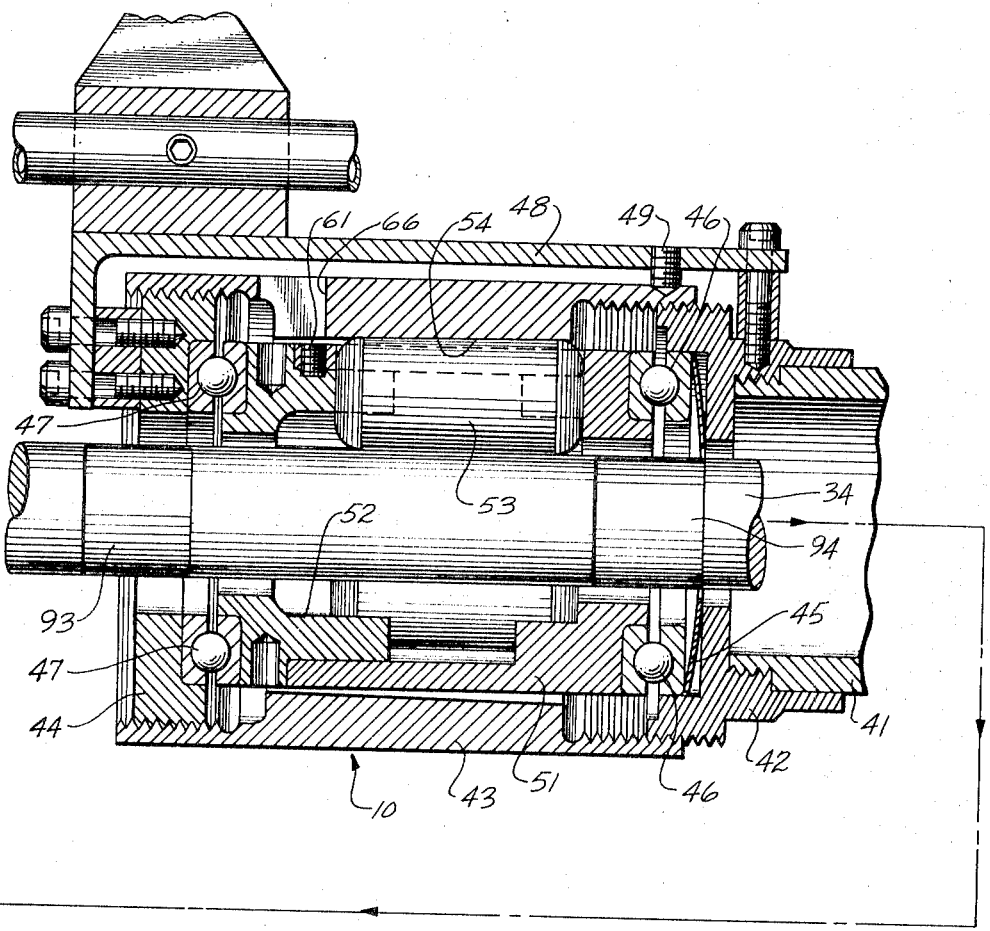
FIG. 2 is a longitudinal cross section of the tube expanding apparatus of FIG. 1.
Figure 2:
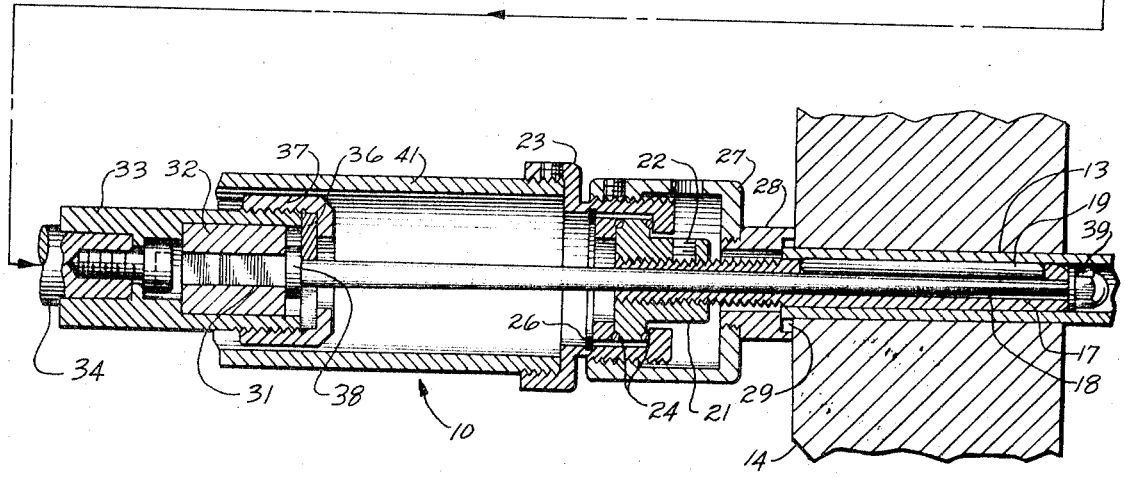

FIG. 2 illustrates in longitudinal cross section the tube expanding apparatus 10 of FIG. 1, with the illustration divided into two sections of slightly different scale to best illustrate principles of this invention. The upper portion of FIG. 2 is on a larger scale than the lower portion of FIG. 2 in order to better illustrate the feed drive mechanism. As illustrated in this embodiment, the forward end of an expander cage 17 on the forward end of the tube expanding apparatus is inserted in a tube 13 to be swaged into a tube sheet or header 14. The expander cage 17 is a hollow cylindrical member through which a tapered mandrel 18 passes. Three swaging rollers 19, one of which is seen in FIG. 2, are contained within longitudinal slots in the cage 17 so that each of the swaging rollers bears on one side against the tapered mandrel 18 and on the other side against the inside wall of the tubing 13. The rollers 19 are tapered in reverse to the mandrel at one half the angle of taper of the mandrel so that the external bearing surface of the rollers against the tube wall is substantially parallel to the axis of the tube expander.

The rearward end of the expander cage 17 is threaded into a mounting collar 21 and the two parts are locked in position by a set screw 22 so that the parts are not unscrewed when the direction of rotation is reversed. Set screws or the like are also employed on other threaded joints hereinafter mentioned for the same reason, or if preferred keys or other locking mechanisms can be employed for the same purpose. The mounting collar 21 is rotatably mounted in a forward housing piece 23 by a pair of thrust bearings 24 which are held in place by a snap ring 26. This permits the cage 17 to rotate about its axis within the tube expanding apparatus and within the tube 13. The rotating expander cage 17, along with the rotating mandrel 18, permits the swaging rollers 19 to rotate about their own axes and also rotate or precess about the mandrel axis to uniformly swage the tube outwardly. During operation the mandrel advances within the cage and the cage does not advance within the tube.

A protective casing 27 surrounds the mounting collar 21 and is attached to the forward housing piece 23. This casing 27 also supports a forward guide ring 28, having a recessed portion 29, to accommodate, or provide clearance for, the end of the tubing 13 sticking out from the surface of the tube sheet 14. The depth of the clearance for the end of the tubing determines the length of tubing projecting from the face of the tube sheet. A slight skew of the swaging rollers 19 draws the end of the tubing out of the tube sheet for subsequent welding and the length drawn out is limited by the depth of the clearance.

The larger end of the tapered mandrel 18 terminates in a square shank 31 which is fitted into a square hole in a bushing 32, which preferably has a square, hexagonal, or other non-round perimeter fitted into a similar hole in a mounting adapter 33 which is in turn bolted to a cylindrical shaft 34. A U-shaped retainer 36 is held onto the mounting adapter 33 by a threaded cap 37. The retainer 36 bears against a flange 38 on the mandrel 18 so that the mandrel is thereby rigidly secured to the shaft 34 and rotates and translates therewith. Other details of means for mounting the mandrel 18 to the shaft 34 can readily be provided by one skilled in the art. The mandrel 18 may also include a cap nut 39 or the like to prevent the mandrel from being accidentally withdrawn from the expander cage 17.

A sleeve 41 is threaded into the forward housing piece 23 and extends rearwardly along the tube expanding apparatus. A support ring 42 (upper portion of FIG. 2) is threaded on the opposite end of the forward housing piece 23. A main housing 43, cylindrical on the outside, is threaded onto the support ring 42, and a rear housing piece 44 is threaded into the rear portion of the main housing 43. The threads between the support ring 42 and the main housing 43 have the same handedness as threads between the rear housing piece 44 and the main housing to provide clearance adjustment as hereinafter described in greater detail.

During assembly the support ring 42 and rear housing piece 44 are screwed toward each other within the main housing 43 in order to obtain a desired preload or clearance on a pair of thrust bearings 46 and 47. After the desired preload is obtained, the rear housing piece 44 and support ring 42 are fixed so as to prevent relative rotation therebetween by an L-shaped bracket 48 bolted to both pieces. If desired, a plurality of such brackets or other locking means to prevent relative rotation may be employed. A plurality of bolt holes are provided in either or both the support ring and the rear housing piece so that they can be locked in any relative position with a desired preload on the bearings 46 and 47. A Belleville spring 45 against the bearing 46 provides a resilient preload and helps maintain adjustment as hereinafter described. A set screw 49 mounted on the bracket 48 prevents rotation of the main housing piece 43 relative to the bracket except for adjustment as hereinafter described in greater detail.

A retainer cage 51 and adjusting guide sleeve 52 are mounted between the forward thrust bearing 46 and rearward thrust bearing 47 so as to be able to rotate freely within the housing 43. Three driving rollers 53 are mounted in the retainer cage so as to have one edge engaging the cylindrical shaft 34 and another edge engaging the inside surface 54 of the main housing 43. The retainer cage 51, sleeve 52 and drive rollers 53 are further illustrated in the exploded view of FIG. 3. If desired a greater number of driving rollers could be used.

Figure 3:
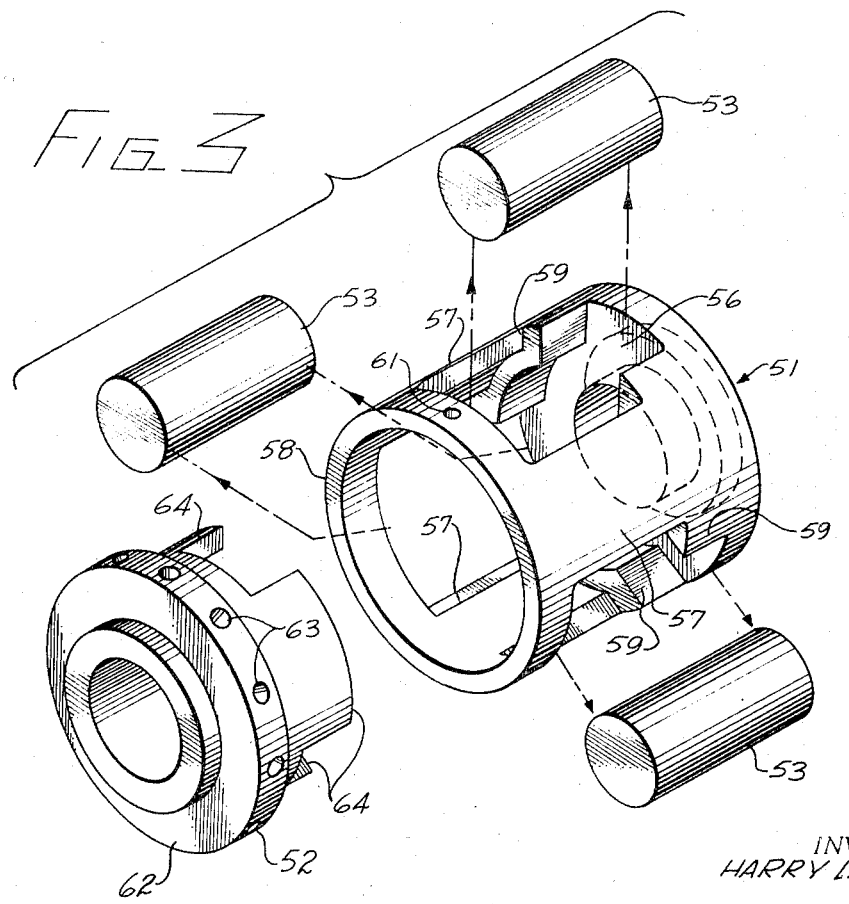
FIG. 3 is an exploded view of the feed drive portion of the apparatus of FIG. 2.

As seen in more detail in the exploded view of FIG. 3, the retainer cage 51 has an apertured forward end plate 56 and three ribs 57 connected thereto, which extend to a rearward ring 58. The ribs are spaced far enough apart that the drive rollers 53 fit free between them. Three tangs 59 at the base of the ribs 57 adjacent the end plate 56 are mutually spaced apart by a distance substantially the same as the diameter of the drive rolls 53. Thus, when assembled, one end of each of the rolls 53 is between a pair of the tangs 59. A set screw 61 is provided through the side of the ring 58, as hereinafter mentioned. Although the cage 51 is illustrated as a single piece, it will be apparent that if desired it can be fabricated from several parts.

The adjustment sleeve 52 has a rearward end plate 62 also apertured to accommodate the rotatable shaft 34 (FIG. 2). A plurality of blind holes 63 in the perimeter of the end plate 62 are used for adjustment as hereinafter described. Three tangs 64 on the adjustment sleeve 52 correspond to the tangs 59 on the retainer cage 51. The spacing between adjacent tangs 64 on the adjusting sleeve is substantially equal to the diameter of the drive rollers 53 so that when assembled the rearward ends of the drive rollers are between adjacent tangs 64. The external diameter of the adjusting sleeve 52 at the periphery of the tangs 64 is small enough to just fit within the ring 58 of the retainer cage.

Thus, when assembled, the retainer cage 51 and adjusting sleeve 52 have respective tangs 59 and 64 engaging opposite ends of the drive rollers 53. The retainer cage and adjusting sleeve are also rotatable or twistable relative to each other through a small angle about their common axis so that as these two pieces are twisted relative to each other, the drive rollers are adjustably skewed relative to the shaft 34 and the main housing 43. In order to adjust the angle of skewing, an opening 66 is provided in one side of the main housing 43 so that access can be had to the set screw 61 in the cage 51 and the holes 63 in the adjusting ring 52 (see FIGS. 2 and 5). A plurality of access openings 66 can be used for greater convenience. In order to adjust the angle of skew, the set screw 61 in the cage is loosened to permit relative rotation between the cage and adjusting ring. A pin (not shown) is then inserted in one of the holes 63 to rotate the adjusting ring relative to the retainer cage. This skews the rollers 53 and when the desired angle of skew is obtained as indicated by measuring indicia 67 (FIG. 5), the set screw 61 is again tightened against the sleeve to prevent relative rotation between the adjusting sleeve and cage.

When the axes of the drive rollers 53 are skewed relative to the rotating shaft 34, the rollers also rotate within the housing 43, much in the manner of planetary gears. Since the drive rollers are skewed, the direction of application of force between the rollers and shaft, and between the rollers and housing, is at a small angle from a plane normal to the shaft axis. Because of this there is a force component along the shaft axis, as well as the component normal to the shaft axis. This force component causes the rotating shaft to advance relative to the housing at a slow rate, just as if the shaft were threaded with a very fine thread. The rate of advance of the shaft is dependent on the skew angle between the axes of the drive rollers and the axis of the shaft, that is, the angle by which the axes of the rollers deviate from being parallel to the axis of the shaft. If the skew angle is zero, there is no shaft feed. If the skew angle is doubled from some previous setting, the feed rate is doubled for any selected shaft rotation speed.

It is preferred in operating an apparatus for tube expanding to maintain a small skew angle in the order of only a few degrees so that the feed rate of the tapered mandrel is relatively low and uniform internal swaging is obtained. Such small angles are readily obtained in the described apparatus by twisting the adjusting sleeve 52 relative to the cage 51 each of which has tangs which bear on opposite ends of the rollers. It will be apparent that instead of tangs between rollers at each end, a substantially cylindrical tang can be used for each end of each roller to fit within an axial hole in the roller for adjusting skew angle.

In building a feed mechanism for a shaft wherein skewed rollers are employed, a tight fit must be provided between the rotating shaft 34, the drive rollers 53 and the housing 43 within which the drive rollers rotate. This is to assure that the drive rollers do not merely float in the housing but do exert a force tending to advance the shaft 34. Further, as a feed mechanism is operated over a substantial period of time, wear of the components occurs and some means is preferably provided for compensating for such wear. There is, therefore, in a preferred embodiment a simple arrangement for adjusting the clearance between the shaft, rollers and housing.

In the illustrated embodiment, as seen in FIG. 2, the inside surface 54 of the main housing 43 is provided with a slight taper, normally, in the range of only a few degrees. As illustrated, the main housing 43 has a relatively smaller inside diameter at its rearward end and a relatively larger inside diameter at its forward end, and it will be apparent that the reverse of this taper could be employed if desired. The drive rollers 53 are tapered at half the angle of the housing so as to fit tightly throughout their length between the tapered inside surface 54 of the housing and the cylindrical shaft 34.

In order to adjust the tightness of fit of the drive rollers 53, the set screw 49 between the bracket 48 and the main housing 43 is loosened, and the main housing is rotated in the threads between the housing and the support ring 42, and between the housing and the rear housing piece 44. As pointed out hereinabove, the support ring 42 and the rear housing piece 44 are connected together by the bracket 48 to prevent relative rotation, and the threads on both pieces have the same handedness. Further, the drive rollers 53 are in a fixed longitudinal position in the cage which is mounted in bearings 46 and 47 between the support ring and the rear housing piece. Therefore, as the main housing 43 is rotated in the threads, it will advance or retreat relative to the drive rollers 53, thereby changing the portion of the inside surface 54 acting on the drive rollers and thereby changing the effective clearance between the rotating shaft and the main housing.

The strong Belleville spring 45 or the like between the support ring 42 and the forward bearing 46 biases the cage 51 and hence the drive rollers 53 rearwardly into tight engagement with the taper on the inside surface of the housing, and because of the present loading on the bearings 46 and 47, the rollers are constantly held in tight engagement with the housing. The adjustment of the housing is made initially and need not be made again until significant wear has occurred in the drive mechanism. The spring loading is also of value in providing a torque limit wherein the rollers slip as the shaft rotates to prevent overloading if the torque limiting arrangement hereinafter described should fail to function. The provision of a Belleville spring is optional and it is found that good adjustment is maintained for long periods even without it since the shaft, drive rollers and housing are lubricated and wear is not a great problem.

By providing the skewed drive rollers remote from the point of swaging, the surfaces are kept clean and wear is thereby minimized. The drive rollers can also be lubricated to operate freely and further minimize wear. The presence of lubrication between the shaft and rollers and the housing and rollers is not detrimental to the feeding action since only small angles are present, and only a small coefficient of friction is needed. Having lubrication on the drive rollers remote from the swaging rolls minimizes the possible contamination that may be introduced in tubing being enlarged.

As mentioned briefly hereinabove, the tube expanding apparatus 10 is operated by a conventional hand operated reversible drill motor 11 which can be electrically or pneumatically driven. As is seen more clearly in FIGS. 4 and 5, the rotatable shaft 34 of the tube expanding apparatus is preferably connected to a conventional chuck 68 on the drill. If the shaft 34 were the only connection between the tube expanding apparatus and the drill motor, it would be very difficult for an operator to control the apparatus since the torque load between the housing and drill motor is high. There is a heavy torque load exerted by the drive rollers on both the shaft 34 of the tube expanding apparatus and on the main housing 43 so that the tube expander and drill motor tend to twist relative to each other in opposite directions. This twisting tendency can be overcome by a rigid connection between the drill motor 11 and the tube expanding apparatus 10; however, it is preferable to provide a torque limiting mechanism therebetween so that a uniform tube expansion can be obtained. As the tube becomes tighter in the tube sheet, for example, the resistance to further expansion increases, increasing the load on the tapered mandrel and the torque between the expanding apparatus 10 and the drill motor 11 increases.

Such a torque limiting interconnection between the tube expander and drill motor is illustrated in the top and side views of FIGS. 4 and 5, respectively. A block 71 is provided on the bracket 48 on the tube expanding apparatus, and an eye 72 is provided on the block for connection to a cable 69 of the support sling 12 for overhead support of the apparatus. A cylindrical rod 73 passes through the block 71 and is held in place by a set screw 74. The rod 73 thereby serves as a rigid extension of the tube expanding apparatus 10 toward the drill motor 11.

A bushing block 76 is mounted on the cylindrical rod 73 so as to be free to slide along the length thereof and rotate thereabout. The bushing block 76 supports a switch 77 which is operated by a plunger 78. Preferably the switch 77 is adjustably mounted on the bushing block for obtaining proper operation of the plunger 78 by a camming surface hereinafter described. Also on the bushing block 76 is an L-shaped side bracket 79 rigidly extending to one side of the bushing block and having a portion of the L extending above the top of the bushing block.

Attached to the upper handle 81 of the drill motor 11 is a sleeve 82. A cable 83 is also attached to the handle 81 for support of the motor. An arm 84 extends from the sleeve 82 towards and above the rod 73 extending from the tube expanding apparatus. A pivot 86 interconnects the arm 84 and the bushing block 76 for rotation about an axis normal to the axis of the rotating shaft 34 between the drill motor and tube expanding apparatus. A heavy tension spring 87 interconnects the end of the arm 84 beyond the pivot 86, and the upstanding portion of the L-shaped side bracket 79 so as to urge the arm 84 and bar 73 into alignment. A stop (not shown) within the pivot 86 prevents over-travel. A camming surface 88 on the end of the arm 84 is aligned with the plunger 78 of the switch 77.

The sling 12 supporting the apparatus also serves to limit relative twisting of the tube expander and the drill motor during use. When there is no torque exerted by the motor, the weight of the parts below the sling support holds the parts in alignment including the arm 84 and bar 73. When the tube expanding cage is inserted in a tube to be expanded and a torque is applied, the housing tends to twist in one direction and the motor in the opposite direction, which would tend to wrap the cables 69 and 83 around the respective parts. Since the end of the expander is in a tube, however, the apparatus is prevented from "climbing" the cables and only a limited relative twist can occur before the cables of the sling are fully tightened. This serves as a torque limit and permits the operator to handle the apparatus without auxiliary mechanisms.

In operation, when the drill motor operates the tube expanding apparatus, the initial torque is insufficient to deflect the spring 87 and the arm 84 and bar 73 remain in alignment. As the resistance to tubing expansion increases, the tendency to twist between the arm and the bar increases and the load on the spring 87 therefore also increases, extending the spring. When the torque level is sufficiently high, the camming surface 88 comes around to a point where the plunger 78 on the switch is actuated and the switch is thereby operated. This switch 77 is connected to the power supply for the drill motor 11 so that the motor is thereby reversed, further tube expansion is stopped, and the mandrel 18 is retracted. An adjusting nut 89 on the mounting for the spring 87 permits adjustment of the spring tension so that a desired torque level can be preset. The relative twist between the arm 84 and rod 73 is readily accommodated by the perpendicular axes of rotation in the pivot 86 and between the bushing block 76 and rod 73. Translation of the bushing block along the rod occurs as the motor and shaft 34 advance or retract.

Other suitable torque setting arrangements can readily be provided by one skilled in the art using other types of spring biasing or toggles or other over-center arrangements for reversing the motor rotation when a desired torque level is obtained. If desired, a current measure on the drill motor can be used to reverse motor power when a selected torque, and hence power, level is reached. If this is done, a rigid connection may be provided between the drill motor and tube expander or one may rely wholly on the cable sling 12 to limit relative rotation.

A stopping collar 91 is provided on the shaft 73 and held in place by a set screw 92. It will be recalled that as the tube expanding apparatus operates, the rotating shaft 34 advances into the apparatus to drive the mandrel forward. This brings the drill motor 11 and also the bushing block 76 closer to the tube expanding apparatus. The collar 91 provides an adjustable stop for the bushing block 76 so that the rotating chuck 68 does not come in contact with the rearward end of the tube expanding apparatus.

In order to minimize impact on the stopping collar 91 by the bushing block 76, the driving force is partially relieved by reducing the diameter of the shaft 34 in a region 93 where the shaft would stop when the stop 91 is reached. The amount of relief is slight and extends over a length of the shaft equal to about one half the length of the driving rollers 53. The end of the relieved portion 93 nearer the rollers is even with the diameter of the shaft and the opposite end is undercut only about 0.010 inch, so that a very slight conical surface is produced in the relieved portion. When the driving rollers encounter the relieved region of the shaft, the pressure between the housing and rollers and between the shaft and rollers is reduced so that the driving force is reduced. A similar relieved region 94 is provided on the shaft 34 in the region where it is desired to end the withdrawal of the mandrel 18 with the forward end of the relief having a diameter reduced about 0.010 inch from the shaft diameter and a rearward end equal in diameter to the shaft diameter.

Although a presently preferred embodiment of this invention has been described herein, many modifications and variations will be apparent to one skilled in the art. Thus, for example, a built-in drive can be employed with the tube expanding apparatus; however, the ready availability of electric and pneumatic drill motors in manufacturing plants and at remote locations makes this driving arrangement particularly attractive. Modifications can also be made in the mounting arrangement for the drive rollers to adjust the skew and clearance and also other torque limiting arrangements can readily be provided by one skilled in the art. Another variation is a feeding mechanism where the housing is cylindrical and the shaft tapered to provide for adjustment and in such an arrangement the shaft is short and a relatively longer housing moves relative to the drive rollers. Such an arrangement is useful, for example, in a tool for facing the ends of tubing protruding from a tube sheet.

What is claimed is:

1. A shaft feeding apparatus comprising:
   a rotatable shaft;
   a substantially fixed housing surrounding a portion of the shaft, said shaft and housing being axially movable relative to each other;
   a cage mounted between the rotatable shaft and the fixed housing, said cage being free to rotate relative to the housing and relative to the rotatable shaft;
   a plurality of cylindrical rollers positioned by the case and each having one side bearing against the housing and another side bearing against the shaft; each of the rollers having a length substantially greater than its diameter; and
   means skewing the axes of the rollers about a line running between, and substantially normal to, the axis of each roller and the axis of the shaft for moving the shaft and housing axially relative to each other.

2. An apparatus as defined in claim 1 wherein the means for skewing includes means for adjusting the angle of skew of the rollers relative to the shaft axis.

3. A shaft feeding apparatus comprising:
   a rotatable shaft;
   a substantially fixed housing surrounding a portion of the shaft, said shaft and housing being axially movable relative to each other;
   a cage mounted between the rotatable shaft and the fixed housing, said cage being free to rotate relative to the housing and relative to the rotatable shaft;
   a plurality of rollers positioned by the case and having one side bearing against the housing and another side bearing against the shaft; and
   means skewing the axes of the rollers about a line running between, and substantially normal to, the axis of each roller and the axis of the shaft for moving the shaft and housing axially relative to each other, including
   means for adjusting the angle of skew of the rollers relative to the shaft axis comprising:
   an adjusting sleeve; and
   a plurality of tangs on the adjusting sleeve, the tangs engaging an end of each of the rollers; and
   said cage comprising a plurality of tangs engaging the opposite end of the rollers from the end engaged by the tangs on the adjusting sleeve, said adjusting sleeve and said cage being twistable relative to each other for skewing the opposite ends of the rollers in opposite directions.

4. An apparatus as defined in claim 3 wherein the housing includes a tapered inside surface bearing on the rollers; the shaft is cylindrical; and the rollers are tapered to fit between the shaft and the tapered inside surface of the housing; and further comprising:

means for shifting the housing and the rollers relative to each other in a direction along the axis of the shaft.

5. A shaft feeding apparatus comprising:
a rotatable shaft;
a substantially fixed housing surrounding a portion of the shaft, said shaft and housing being axially movable relative to each other;
a cage mounted between the rotatable shaft and the fixed housing, said cage being free to rotate relative to the housing and relative to the rotatable shaft;
a plurality of rollers positioned by the cage and having one side bearing against the housing and another side bearing against the shaft; and
means skewing the axes of the rollers about a line running between, and substantially normal to, the axis of each roller and the axis of the shaft for moving the shaft and housing axially relative to each other; and wherein
the housing includes a tapered inside surface bearing on the rollers;
the shaft is cylindrical; and
the rollers are tapered to fit between the cylindrical shaft and the tapered inside surface of the housing; and further comprising:
means for shifting the housing and the rollers relative to each other in a direction along the axis of the shaft.

6. Apparatus as defined in claim 1 further comprising means for limiting torque between the housing and the rotatable shaft.

7. A shaft feeding apparatus comprising:
a rotatable shaft;
a substantially fixed housing surrounding a portion of the shaft, said shaft and housing being axially movable relative to each other;
means for resiliently biasing the rollers toward the smaller end of the tapered inside surface of the housing.

8. A shaft feeding apparatus comprising:
a rotatable shaft;
a substantially fixed housing surrounding a portion of the shaft, said shaft and housing being axially movable relative to each other;
a cage mounted between the rotatable shaft and the fixed housing, said cage being free to rotate relative to the housing and relative to the rotatable shaft;
a plurality of rollers positioned by the cage and having one side bearing against the housing and another side bearing against the shaft;
means skewing the axes of the rollers about a line running between, and substantially normal to, the axis of each roller and the axis of the shaft for moving the shaft and housing axially relative to each other;
motor means for rotating the shaft;
means for limiting torque between the housing and the rotatable shaft comprising:
switch means for reversing the motor means; and
torque operated means for operating the switch means in response to a preselected torque level; and
means for adjusting the angle of skew of the rollers relative to the shaft axis comprising:
an adjusting sleeve; and
a plurality of tangs on the adjusting sleeve, the tangs engaging an end of the roller; and wherein
said cage having a plurality of tangs engaging the opposite end of the rollers from the end engaged by the tangs on the adjusting sleeve, said adjusting sleeve and said cage being twistable relative to each other for skewing the opposite ends of the rollers in opposite directions; and wherein the shaft is cylindrical;
the housing includes a tapered inside surface bearing on the rollers; and
the rollers are tapered to fit between the cylindrical shaft and the tapered inside surface of the housing; and further comprising:
means for shifting the housing and the rollers relative to each other in a direction along the axis of the shaft; and to each other;
a cage mounted between the rotatable shaft and the fixed housing, said cage being free to rotate relative to the housing and relative to the rotatable shaft;
a plurality of rollers positioned by the cage and having one side bearing against the housing and another side bearing against the shaft;
means skewing the axes of the rollers about a line running between, and substantially normal to, the axis of each roller and the axis of the shaft for moving the shaft and housing axially relative to each other; and
means for limiting torque between the housing and the rotatable shaft comprising:
motor means for rotating the shaft;
a first cable connected between the motor means and a support;
a second cable connected between the housing and the support, whereby rotation of the motor means and housing in opposite directions is limited.

9. A shaft feeding apparatus comprising:
a rotatable shaft;
a substantially fixed housing surrounding a portion of the shaft, said shaft and housing being axially movable relative to each other;
a cage mounted between the rotatable shaft and the fixed housing, said cage being free to rotate relative to the housing and relative to the rotatable shaft;
a plurality of rollers positioned by the cage and having one side bearing against the housing and another side bearing against the shaft;
means skewing the axes of the rollers about a line running between, and substantially normal to, the axis of each roller and the axis of the shaft for moving the shaft and housing axially relative to each other;
means for limiting torque between the housing and the rotatable shaft; and
a relieved portion on the shaft having a smaller diameter than the adjacent portions of the shaft for at least partly reducing pressure between the housing and the rollers and the shaft and the rollers.

10. A shaft feeding apparatus comprising:
a rotatable shaft;
a substantially fixed housing surrounding a portion of the shaft, said shaft and housing being axially movable relative
a cage mounted between the rotatable shaft and the fixed housing, said cage being free to rotate relative to the housing and relative to the rotatable shaft;
a plurality of rollers positioned by the cage and having one side bearing against the housing and another side bearing against the shaft;
means skewing the axes of the rollers about a line running between, and substantially normal to, the axis of each roller and the axis of the shaft for moving the shaft and housing axially relative to each other;
motor means for rotating the shaft; and means for limiting torque between the housing and the rotatable shaft comprising:
switch means for reversing the motor means; and
torque operated means for operating the switch means in response to a preselected torque level.

* * * * *

UNITED STATES PATENT OFFICE
CERTIFICATE OF CORRECTION

Patent No. 3,656,357    Dated April 18, 1972

Inventor(s) Harry L. Corwin

It is certified that error appears in the above-identified patent and that said Letters Patent are hereby corrected as shown below:

Column 6, line 5, "present" should read -- preset --.
Claims 7 and 8 should appear as shown below:

7. A shaft feeding apparatus coma rotatable shaft;

a substantially fixed housing surrounding a portion of the shaft, said shaft and housing being axially movable relative to each other;

a cage mounted between the rotatable shaft and the fixed housing, said cage being free to rotate relative to the housing and relative to the rotatable shaft;

a plurality of rollers positioned by the cage and having one side bearing against the housing and another side bearing against the shaft;

means skewing the axes of the rollers about a line running between, and substantially normalto, the axis of each roller and the axis of the shaft for moving the shaft and housing axially relative to each other;

UNITED STATES PATENT OFFICE
CERTIFICATE OF CORRECTION

Patent No. 3,656,357                     Dated    April 18, 1972

Inventor(s)        Harry L. Corwin                PAGE - 2

It is certified that error appears in the above-identified patent and that said Letters Patent are hereby corrected as shown below:

motor means for rotating the shaft; and means for limiting torque between the housing and the rotatable shaft comprising switch means for reversing the motor means, and torque operated means for operating the switch means in response to a preselected torque level.

--8. A shaft feeding apparatus comprising:

a rotatable shaft;

a substantially fixed housing surrounding a portion of the shaft, said shaft and housing being axially movable relative to each other;

a cage counted between the rotatable shaft and the fixed housing, said cage being free to rotate relative to the housing and relative to the rotatable shaft;

a plurality of rollers positioned by the cage and having one side bearing against the housing and another side bearing against the shaft;

means skewing the axes of the rollers about a line running between, and substantially normal to, the axis of each roller and the axis of the shaft for moving the shaft and housing axially relative to each other;

motor means for rotating the shaft;

means for limiting torque between the housing and the rotatable shaft comprising:

.... Cont'd

FO-1050
(5/69)

UNITED STATES PATENT OFFICE
CERTIFICATE OF CORRECTION - Page 3

Patent No. 3,656,357  Dated April 18, 1972

Inventor(s) Harry L. Corwin

It is certified that error appears in the above-identified patent and that said Letters Patent are hereby corrected as shown below:

⌈ ...Cont'd ⌉ switch means for reversing the motor means; and torque operated means for operating the switch means in response to a preselected torque level; and means for adjusting the angle of skew of the rollers relative to the shaft axis comprising:

an adjusting sleeve; and a plurality of tangs on the adjusting sleeve, the tangs engaging an end of the roller; and wherein said cage having a plurality of tangs engaging the opposite end of the rollers from the end engaged by the tangs on the adjusting sleeve, said adjusting sleeve and said cage being twistable relative to each other for skewing the opposite ends of the rollers in opposite directions; and wherein the shaft is cylindrical;

the housing includes a tapered inside surface bearing on the rollers; and the rollers are tapered to fit between the cylindrical shaft and the tapered inside surface of the housing; and further comprising;

means for shifting the housing and the rollers relative to each other in a direction along the axis of tl shaft; and means for resiliently biasing the rollers toward the smaller end of the tapered inside surface of the housing.--

⌊ ⌋

Signed and sealed this 3rd day of October 1972.

(SEAL)
Attest:

EDWARD M. FLETCHER, JR.            ROBERT GOTTSCHALK
Attesting Officer                  Commissioner of Patents